(12) United States Patent
Petzitillo, Jr. et al.

(10) Patent No.: US 6,309,153 B1
(45) Date of Patent: Oct. 30, 2001

(54) INTERMODAL TRANSFER TRAILER

(75) Inventors: Anthony D. Petzitillo, Jr., Sicklerville; Kenneth E. Smith, Jr., Erial, both of NJ (US)

(73) Assignee: Accurate Industries, Inc., Erial, NJ (US)

( * ) Notice: Subject to any disclaimer, the term of this patent is extended or adjusted under 35 U.S.C. 154(b) by 0 days.

(21) Appl. No.: 09/541,330

(22) Filed: Apr. 3, 2000

Related U.S. Application Data

(62) Division of application No. 08/961,537, filed on Oct. 30, 1997.

(51) Int. Cl.[7] .................................................. B60P 7/13
(52) U.S. Cl. ................... 410/73; 410/69; 410/70; 410/72; 410/77; 410/83; 410/91
(58) Field of Search ........................ 410/69, 70, 71–73, 410/76, 77, 80, 82, 83, 91, 94; 280/406.1; 248/681, 500, 503

(56) References Cited

U.S. PATENT DOCUMENTS

| | | | | |
|---|---|---|---|---|
| 3,321,162 | * | 5/1967 | Connerat ................................ | 410/73 |
| 3,354,838 | * | 11/1967 | Mowatt-Larssen ..................... | 410/73 |
| 3,498,238 | * | 3/1970 | Sweger .................................. | 410/70 |
| 3,547,048 | * | 12/1970 | Miller .................................... | 410/73 |
| 3,630,155 | * | 12/1971 | Marulic et al. ........................ | 410/70 |
| 4,776,736 | * | 10/1988 | Tatira ..................................... | 410/83 |
| 5,020,947 | * | 6/1991 | Marcelius .............................. | 410/70 |
| 5,082,304 | | 1/1992 | Preller et al. . | |
| 5,570,981 | * | 11/1996 | Brewster ............................... | 410/70 |
| 5,842,821 | * | 12/1998 | Coslovi et al. ........................ | 410/73 |

FOREIGN PATENT DOCUMENTS

| | | | | |
|---|---|---|---|---|
| 370816 | * | 9/1963 | (CH) ..................................... | 410/91 |

\* cited by examiner

Primary Examiner—Stephen T. Gordon
(74) Attorney, Agent, or Firm—Duane, Morris & Heckscher LLP

(57) ABSTRACT

A vehicle for temporary support of intermodal cargo containers, especially a trailer for a tractor/trailer rig, has deployable locating pins placed centrally along the length of a chassis, for locating containers placed end-to-end. The locating pins center containers of different lengths relative to the chassis, which is long enough to accommodate the longest standard length of container or two short containers. The locating pins are resiliently mounted such that a long container or misplaced containers that are set down on the pins, cause the pins to be depressed into the chassis. Stop pins define an endpoint for an end of a container, and two resiliently mounted engagement pins on each side, are positioned for engaging the corner fittings of intermodal containers when abutted against the locating pins. A movable section with a hingeable wing structure carrying resiliently mounted engagement pins can be provided on lateral sides of the trailer, lockable when deployed using a manual locking means bearing between the movable section and the chassis, and supporting resiliently retractable engagement pins for coupling with the corner fittings of two or more containers placed end to end.

15 Claims, 4 Drawing Sheets

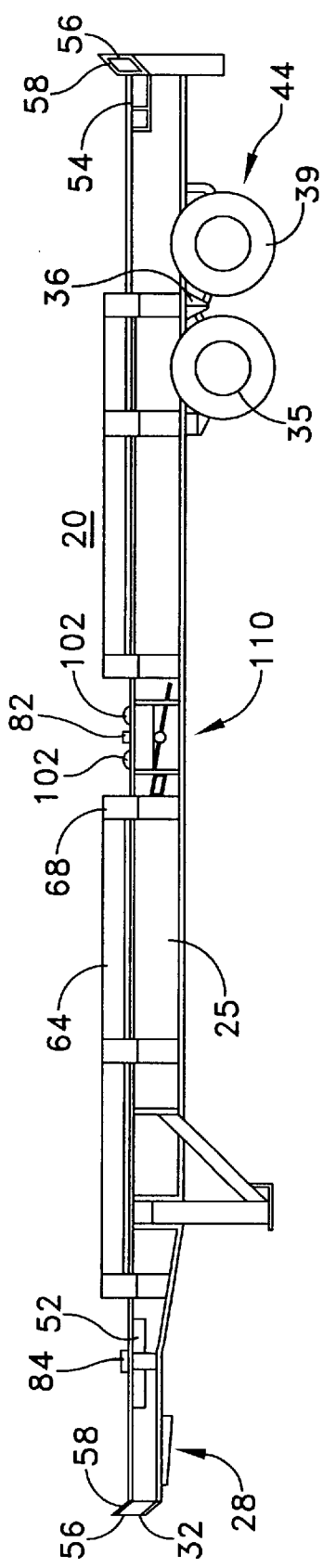
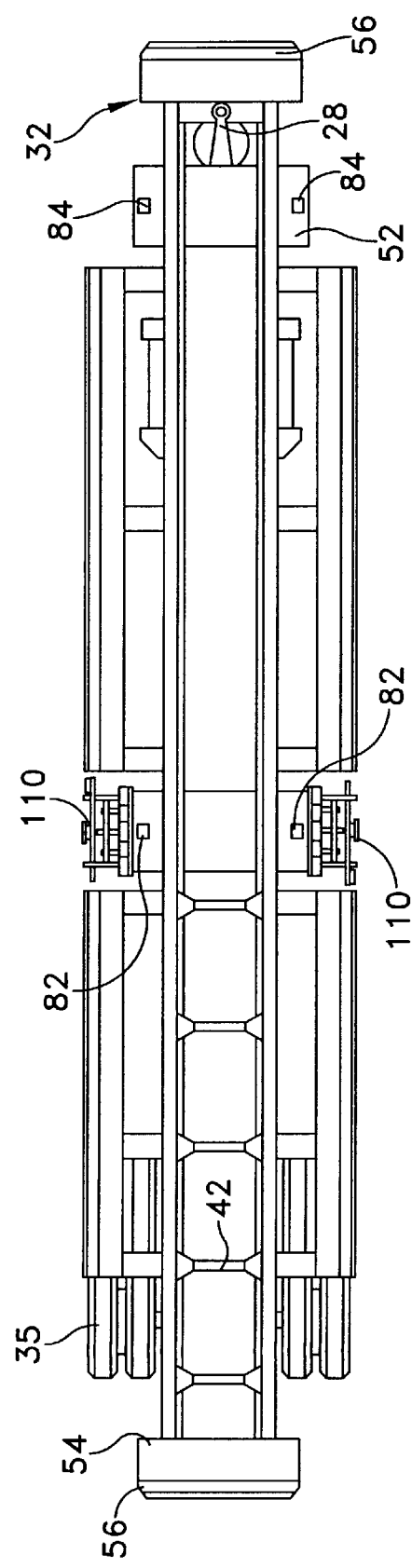

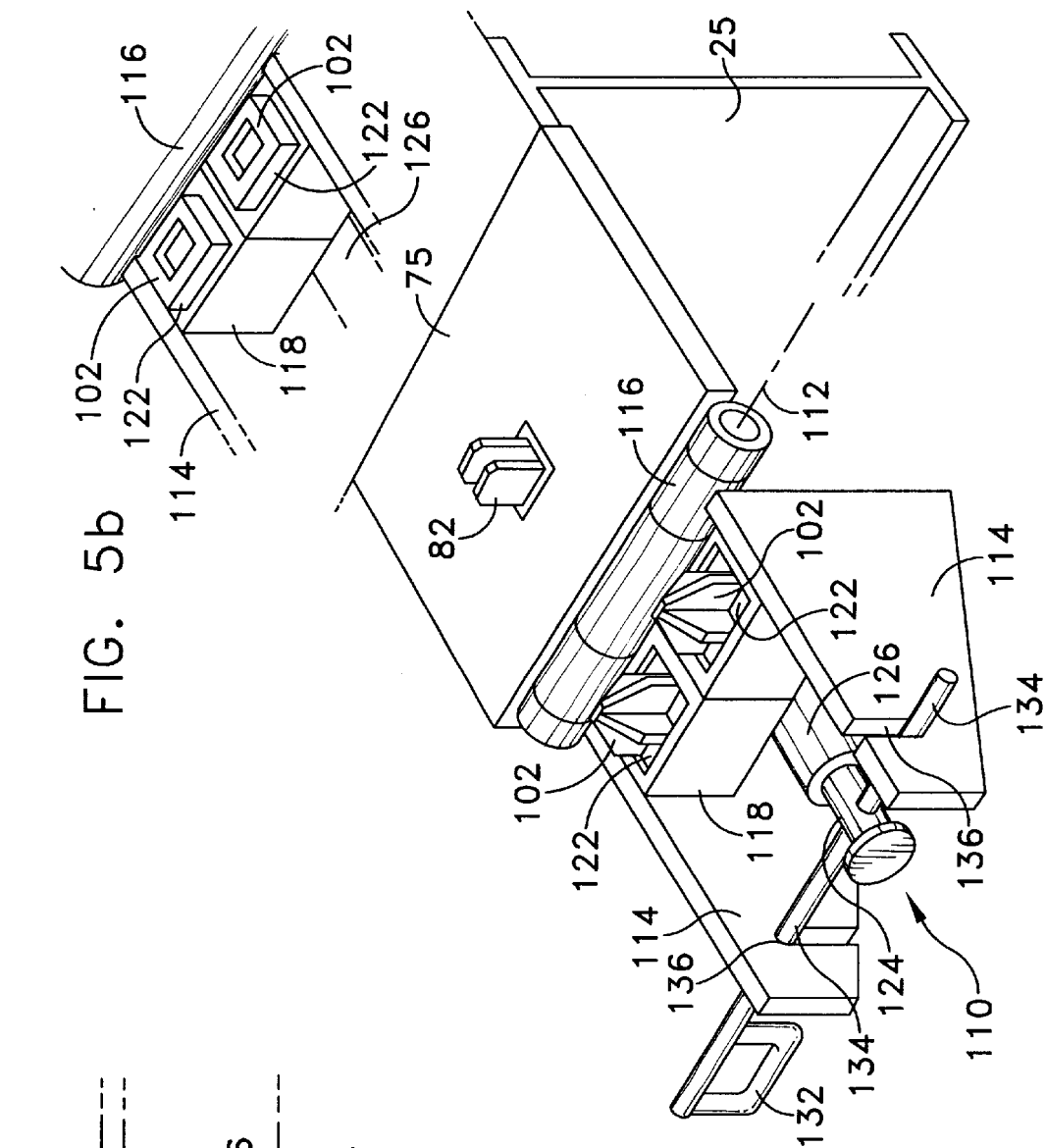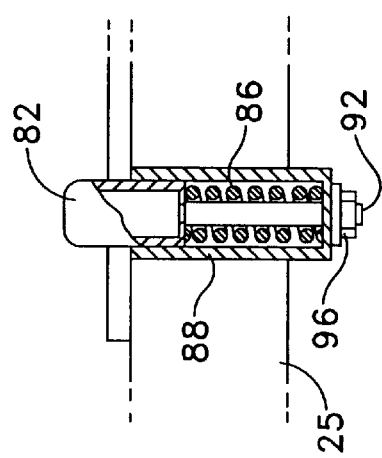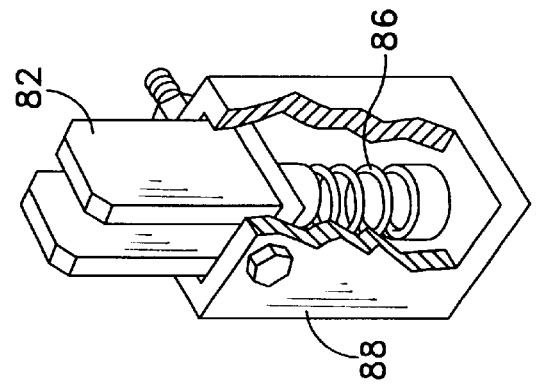

INTERMODAL TRANSFER TRAILER

This appln is a Div. of Ser. No. 08/961,537 filed Oct. 30, 1997.

BACKGROUND OF THE INVENTION

1. Field of the Invention

The invention relates to the field of cargo carrying vehicles such as trailers for tractor/trailer combinations. In particular, a heavy duty trailer for short haul transport of intermodal containers is provided to facilitate loading and unloading. The trailer of the invention is configured to accept containers of different sizes as well as plural containers such as two half-length containers, using centrally located retractable positioning devices. The trailer enables accurate relative positioning of two half-length intermodal containers on a trailer that accommodates various container sizes and thus lacks fixed flanges against which the containers might be abutted for positioning. Raisable side wings are deployable to engage the corners of the containers, and position them sufficiently accurately that two half length trailers can be handled as a unit.

2. Prior Art

Intermodal containers provide an efficient shipping means in that they can be carried by ship, by rail, by truck, etc. Intermodal containers have standard lower corner fittings enabling them to be attached to complementary fittings on trailers, rail cars and the like, as well as upper corner fittings that can be engaged by stacking loaders, cranes and the like. Internationally standard container lengths are nominally 20 and 40 feet (about 6.1 and 12.2 meters). However, nominal 20 foot containers are actually made shorter than 20 feet such that two 20 foot containers with a slight clearance between them can be handled by some of the same equipment as for a 40 foot container (i.e., when positioned at the exact clearance needed to place the outer engagement fittings of the two containers at the positions occupied by those of a 40 foot container). More particularly, a nominal 20 foot container is actually 238.5 inches in length. Correct positioning requires that the two short containers by placed with an exact three inch clearance so that the combined length (including clearance) is 40 feet.

The containers can be engaged at their corner fittings, for example, with twist-lock mechanisms that are positioned to complement the container size. Although there is a margin for error and "floating" twist locks are known, even floating twist locks are only capable of about an inch of lateral displacement. Therefore, positioning is a problem.

All containers come in the same width. Containers are also used, primarily in the USA, in lengths of 45, 48 and 53 feet (about 14, 15 and 16 meters, respectively). The mountings on the trailers, rail cars or the like for carrying the containers have their corner-engaging fittings spaced appropriately for the particular size of trailer. For railroad carriage, a flatbed car may have relocatable corner engaging fittings. For typical a tractor/trailer carriage, the trailer chassis is specific to the particular container length and can carry only one type of container. A trailer capable of handling all such containers must have a bed area as large as the largest container. This aggravates the problem with accurately positioning smaller containers and double half-length containers because it is not readily possible to provide highly efficient locating devices (especially corner engagement couplings) for small containers without occupying the space needed for larger containers.

It would improve efficiency in the handling of containers, especially pairs of half length containers such as so-called "double twenty picks," if the containers could be initially placed with high accuracy. Once correct positioning is obtained, subsequent handling of the containers at least partly using engagement mechanisms for full length containers, does not disturb the correct positioning.

For over-the-road travel, a container is placed on the trailer of a tractor/trailer rig and all four corners of the container are engaged by lockable fittings that secure the container to the trailer. For example, an engagement pin in the trailer can be raised into an opening in the box-like corner structure and twisted to lock the container to the trailer chassis. Containers also can be attached to one another by inter-box connectors having protruding pins, in which event the inter-box connectors can engage in openings in the trailer, rail car or the like. For example, two nominally 20 foot containers can be coupled to one another end to end, and handled using stacking loaders, cranes, trailers and/or rail car repositories that otherwise would handle one 40 foot container.

When loading and unloading a number of containers, for example when unloading containers from a ship or otherwise changing transportation modes for a number of containers, it is important to proceed as quickly as possible. When a ship is being loaded or unloaded in port, the ship is not serving its primary function of transporting cargo, and is not generating income. However, time spent in loading and unloading is unavoidable. To minimize the time spent, for example when unloading containers from a ship, all the containers that need to be unloaded from the ship are unloaded at once to a holding area, using a fleet of transfer trailers that repetitively carry containers from an off-loading area near the ship to an intermediate area of the yard or the like. The ship is thus unloaded quickly. The individual containers are processed later, through more time-consuming steps such as identifying the containers and their destinations, affixing the containers to trailers of appropriate length, and dispatching them to their destinations. Similar steps can be undertaken for loading containers onto a ship, namely preliminary storing the containers destined for a particular ship in a holding area from which the containers can be transferred by repetitive trips using transfer tailers, for loading onto the ship as quickly as the shipyard crane can be operated.

Container ships are generally unloaded by cranes having grappling devices engageable with corners of containers, spaced to couple to single containers or to two or more containers that may be attached but at least must be positioned correctly. For example, a crane may have a boom with a carriage that can be moved over the ship. The grapples are lowered from the carriage to engage a container. The container is lifted over the gunwale and lowered onto the next transport tractor/trailer in a line waiting alongside. However, the crane may be the most expensive and slowest element of the container handling apparatus. It would be advantageous if the crane could proceed unimpeded by the need to correct for imprecise positioning of the containers.

Due to the urge to proceed quickly, a container often is set down rather hard on the transfer trailer. The transfer trailer and its container are removed immediately to clear the way for the next transfer trailer and container. At the intermediate storage point, the container is removed from the trailer by a crane or stacking loader, and the trailer is brought immediately back for another cycle.

It is not necessary during preliminary movement or transfer of containers between an intermediate storage area and a loading or unloading station, to undertake all the same securing steps for affixing the container to the trailer as would be appropriate for over-the-road travel. However, couplings are useful for correctly positioning containers on the trailers for transfer, especially when two or more containers are to be transferred end-to-end.

A problem is presented when the containers to be processed are not all the same size. Even if the containers are of a standard size, it is advantageous also to have the capability of handling a plurality of fractional size containers as a unit, such as two twenty-foot containers on a trailer that is dimensioned for one forty-foot container. It is possible to envision a trailer having alternative fittings spaced to accommodate all the container sizes and combination options that might be encountered, but fittings for smaller (shorter) containers and for plural combined containers could interfere with larger containers. It is also possible to envision corner fittings that are moveable to accommodate different sizes; however, this solution also carries the possibility of damage or interference if one attempts during the hurried unloading of a ship to place a container on fittings that are not properly positioned. These solutions are cumbersome. What is needed is a trailer in which one trailer size fits all containers, provision is made for carrying multiple containers and/or attached containers, and containers can be quickly and dependably positioned for transport.

SUMMARY OF THE INVENTION

It is an object of the invention to provide a transfer trailer for intermodal containers, which includes position defining structures that are insensitive to variations in the length of container carried and can be deployed or retracted.

It is also an object to provide a transfer trailer that can accept single full length containers, two or more shorter containers, and containers of different particular lengths, and can accommodate these variations conveniently with a minimum of manual reconfiguration or adjustment.

It is another object to provide a central deployable engagement pin structure for intermodal containers, which is highly durable, readily deployed or retracted manually, and which is not prone to damage if a full size container or an improperly positioned container is placed on the pin structure when deployed.

It is a further object to provide positive engagement of the corner fittings of half-length containers using durable corner fitting engagement mechanisms on both sides of the trailer, for positively and accurately positioning nominally half-sized containers at the correct clearance to place the corner fittings at their opposite ends in position for engagement by nominally full-sized container engaging mechanisms.

These and other objects are accomplished by a vehicle for temporary support of intermodal cargo containers, especially a trailer for a tractor/trailer rig, with deployable locating pins placed centrally along the length of a chassis, for locating containers placed end-to-end. The locating pins center containers of different lengths relative to the chassis, which is long enough to accommodate the longest standard length of container as well as half length containers of various lengths. The locating pins are resiliently mounted such that a container that is longer than the length set for the pins or that is otherwise set down on the pins, causes the pins to be depressed into the chassis. The locating pins can include stop pins defining an endpoint for an edge of a container, and include two resiliently mounted engagement pins on each side, specifically for engaging the corner fittings of intermodal containers centrally along the length of the trailer. The support structures on either side have a movable section with a hingeable support structure carrying the resiliently mounted pins, lockable when deployed using a manual locking means bearing between the movable section and the trailer chassis.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 2 is a side elevation view thereof;

FIG. 3 is a top plan view thereof;

FIGS. 4a and 4b are partial section views showing alternative locating pin or pop-up pin structures, of the type used as a stop;

FIG. 5a is a partial perspective view showing a deployable/retractable pop-up pin mounting of the type used for engaging a corner fitting of a container;

FIG. 5b is a partial perspective view showing a combined male/female alternative corner engaging fitting;

DETAILED DESCRIPTION OF THE PREFERRED EMBODIMENTS

Figure 1:
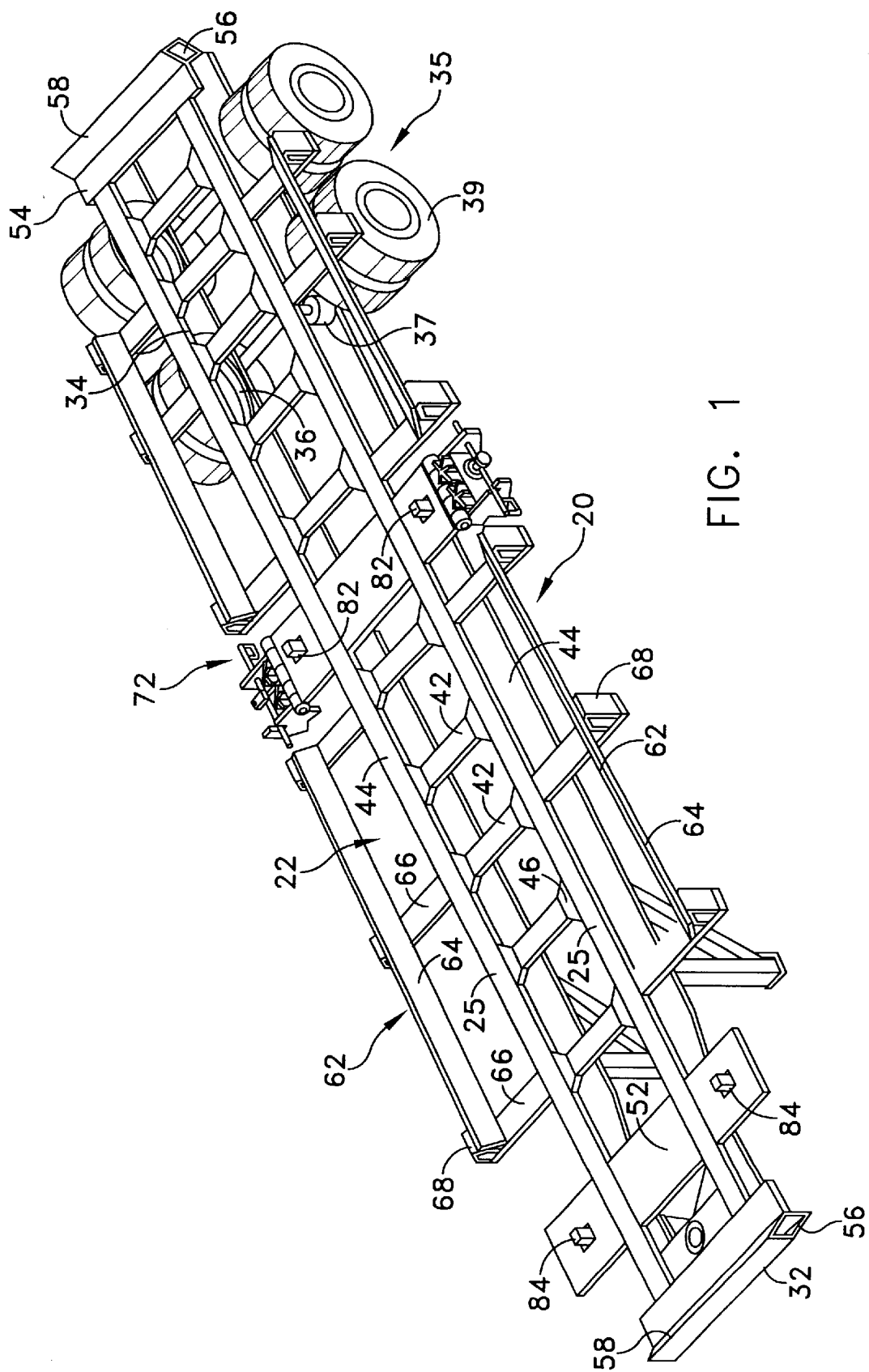
FIG. 1 is a perspective view of an intermodal transfer trailer according to the invention.

Referring to FIGS. 1 through 3, a vehicle in the form of a trailer 20 for a tractor/trailer rig is provided for transport of intermodal containers of at least two different lengths (not shown in FIGS. 1–3). Trailer 20 comprises a chassis 22 that is generally supported on two spaced main beams 25, which can have a solid I-beam cross section. A fifth wheel or king pin connection 28 is coupled to and between main beams 25 at the front end 32 of trailer 20, permitting engagement with a complementary structure on a tractor (not shown). At the rear, main beams 25 are carried on a heavy duty suspension 34 supported by wheels 35, for example a two-axle, eight wheel arrangement that can have conventional heavy duty leaf springs 36 and pneumatic shock absorbers 37, but preferably employs solid rubber forklift-type tires 39.

A plurality of chassis crossmembers 42 are welded transversely between main beams 25. Crossmembers 42 can be angle iron or channel members that extend between the flanges 44 of the I-beam shaped main beams 25. Crossmembers 42 are braced relative to main beams 25 by generally triangularly shaped gusset plates 46 that are welded to main beams 25 and to crossmembers 42.

Front and rear bolster structures bridge between the main beams 25 at their front and rear ends. The bolsters comprise bolster plates 52, 54, defining a part of the bed of the trailer, and reinforcing tubes 56, attached to bolster plates 52, 54. The tubes 56 have a generally parallelogram shaped cross section such that their upper surfaces 58 are inclined downwardly and inwardly toward the chassis bed and main beams 25. Likewise, lateral outriggers 62 are welded to main beams 25 and extend laterally outwardly for supporting outrigger guides 64 that slope downwardly and inwardly toward the bed provided by the bolster plates 52, 54 and the upper surfaces of main beams 25. The inclined bolster and outrigger guide structures are such that if a container is somewhat out of position when lowered onto trailer 20, the outrigger guides and the other inclined surfaces guide the container to move into correct position as it is lowered. The outrigger guides 64 are welded to outrigger support tubes 66, that are in turn welded to main beams 25. The outrigger guides 64 are braced on support tubes 66 by outrigger end caps 68.

In the embodiment shown, trailer 20 has two lengths of outriggers 62 along the longitudinal length of main beams 25 on both lateral sides. Outriggers 62 do not extend into areas adjacent to front bolster plate 52 and rear bolster 54. Near the center of trailer 20, a longitudinal gap 72 is provided between the lengths of outriggers 62. In the area of gap 72, a center bolster plate 75 is mounted to main beams 25 and defines part of the bed of trailer 20.

At least one locating pin 82, 84 is mounted on the bed, preferably a pair of locating pins 82 at a longitudinal center point on center bolster plate 75. Locating pin 82 extends upwardly on the chassis 22 and is intended to provide a retractable abutment against which a lower edge of a container can be placed for locating the position of the container on the trailer. In the embodiment shown, a pair of central locating pins 82 are provided on the bed of chassis 22 for locating a container that is shorter than the full length of the bed, using locating pins 82 as a sole and centrally located reference. In this manner, containers that are relatively short but of indefinite length can be correctly placed symmetrically relative to the center of the trailer.

Locating pins 82, 84 are retractable such that the vehicle can carry a container up to the full length of the bed. Shorter containers are placed laterally against the central locating pin or pins 82, and longer single containers are placed on top of pins 82, causing them to retract against spring bias. By abutting the shorter containers against the locating pins, the corner fittings of the containers are automatically located in correct position for engagement with deployable corner engaging fittings that are discussed in detail below.

The vehicle shown (i.e., trailer 20) has a pair of chassis bed locating pins placed substantially midway along the load bearing length of the trailer, and can have a pair of chassis bed locating pins spaced rearwardly from the front or king pin end, the latter being the abutting reference for longer containers. In this manner, the trailer can carry a range of container sizes. A long container that does not encompass the full length of the bed can be abutted against front locating pins 84. An even longer container can be placed over both sets of pins 82, 84, causing all the pins 82, 84 to retract. The longest containers, for example up to 53 feet (16 meters) rest on and compress all the locating pins, occupying the full length of the bed. Shorter single containers of standard sizes are placed adjacent to the front chassis bed locating pins. Dual half-length containers, namely half size containers of any standard length, are placed adjacent to the central chassis bed locating pins. Thus the trailer can handle a range of container sizes with locating means for each size.

A first embodiment of locating pins 82, 84 is shown in FIG. 4a, and a second embodiment in FIG. 4b. In each case a helical compression spring 86 is disposed in a box-like pin housing 88, open at the top, which slidably supports the locating pin 82 or 84. Each pin housing 88 is welded to the respective bolster plate 52, 75 and to one of main beams 25. Spring 86 is carried on a guide shaft 92 that is captive in housing 88 due to nut 96, and is attached to pin 82, for example by welding. When pin 82 is forced downwardly, spring 86 is compressed between the underside of pin 82 and the bottom of housing 88.

In FIG. 4a, the movable locating pin part has a hollow rectangular structure. Shaft 92 is attached to the pin and nut 96 on shaft 92, and is disposed below housing 88, such that the shaft protrudes when the pin is depressed, and nut 96 limits the upward displacement of pin 82 or 84 while allowing compression of spring 86. In this manner, pin 82, 84 normally protrudes upwardly for defining a longitudinal end position of a container (not shown in FIG. 4), but is depressed downwardly, flush in housing 88, by the weight of a container placed vertically onto pin 82, 84.

In FIG. 4b, pin 82 or 84 comprises two spaced plates that are welded to a baseplate and slidably received in housing 88. Spring 86 is compressed between pipe retainer sections attached to the bottom of housing 88 and to the underside of the baseplate. Spring 86 urges pin 82 upwardly, and the travel of pin 82 is limited by contact with a bolt that extends through housing 88 to define the upward limit.

According to a further aspect of the invention, illustrated in FIG. 5a, trailer 20 also has at least one additional pin 102 disposed on a movable wing section 110 attached along the side of chassis 22 at the longitudinal midpoint, namely being hinged at the lateral sides of center bolster plate 75. The movable wing section 110 carries locating pins 102 that are intended to engage temporarily in the corner engaging structures of half-length containers. By engaging in the corner fittings of two half length containers and thereby positioning the containers positively and precisely at the correct position and clearance, the corner fittings on the opposite ends of the dual containers are likewise placed accurately for engagement by a mechanism that can handle a full length container. The pair of pins 102 restrain containers from movement in any direction in the plane of the chassis bed, as compared with locating pins 82, 84, which restrain a respective container in one direction only. Pins 102 are positioned relative to locating pin 82 on bolster plate 75 such that when a pair of containers are abutted against the front and rear sides of pin 82, the containers are in proper position for pins 102 to engage in the corner fittings of the containers. This can be accomplished either by setting a container down onto the trailer when the wing sections 110 are deployed as shown in FIG. 5, or the wing sections can be moved manually into place to engage the corner fittings after the containers are in place.

Movable wing section 110 is pivotable on a horizontal axis 112 to raise or lower the pin structures that are placed to engage in the corner fittings of two short-length containers placed on trailer 20. Accordingly, two container engaging pins 102 are provided on each lateral side, as opposed to one pin 82 or 84 for abutting the containers on each side. Engagement-type locating pins 102 are spaced apart longitudinally by the distance between the locating fixtures at the corners of adjacent containers. This arrangement is applicable to two short containers using one wing section 110 on each side of the trailer, or more containers using one or more additional wing structures 110 (not shown).

In FIGS. 1 and 2, movable wing structures 110 are pivoted upwardly. In the plan view of FIG. 3, the wing structures 110 are pivoted down. FIG. 5a is a partial section view showing one of the pivotable wing structures in more detail, as deployed upwardly. The pivotable wing structures comprise two side plates 114 carried on a heavy duty hinge mechanism 116 having an axis 112 parallel to the longitudinal axis of trailer 20. A supporting rectangular tube or box 118 is welded between side plates 114 and comprises housings 122 for supporting corner engaging pins 102 in the same manner that locating pins 82, 84 are mounted in housings 88 on the center and front bolster plates 75, 52. A locking weight-bearing shaft 124 is telescopically slidable in a tube 118 that is welded to supporting box 118, being perpendicular to the pivot axis 112 and positioned in a horizontal plane below that of axis 112 when movable wing 110 is raised. Thus, when movable wings 110 are pivoted upwardly into their deployed position, their bearing shafts 124 bear laterally inwardly against main beams 25 under the center bolster, i.e., at a point spaced from the horizontal pivot axis. This allows side plates 114 and the support box 118 between them to bear weight.

When the bearing shafts 124 are unlocked relative to the wing structures 110, the wing structures lack vertical support and pivot downwardly into the retracted position by gravity. Bearing shaft 124 slides outwardly from main beam 25, allowing the wing structures to pivot down. In the upward deployed position, bearing shaft 124 is locked in a position bearing against main beam 25 by a locking handle 132. Handle 132 has extensions 134 on either side of bearing shaft 124, preferably rigidly fixed to the bearing shaft. Handle 132 also can be rotatable on bearing shaft 124, provided shaft 124 is axially locked relative to its support tube 126 when wing 110 is held upwardly.

FIG. 5a illustrates pins 102 with generally pyramidal shapes mounted resiliently (in the same manner as pins 82). Alternatively, rigidly mounted pins can be provided on wings 110. Whereas in FIG. 5a pins 102 are male structures for engaging female fittings at the corners of the containers, it is also possible as shown in FIG. 5b to use a female engaging structure for engaging containers that have male-type fittings, for example as with containers that are coupled together using inter-box couplings having downwardly protruding pins. As another alternative, wings 110 can be provided with twistlock couplings as employed on conventional trailers.

Locking handle 132 can be rotated manually around the axis of bearing shaft 124 as shown in FIG. 5, preferably rotating shaft 124 as well. Clockwise rotation of handle 132 in the embodiment of FIG. 5a sets handle extensions 134 in oppositely oriented slots 136 in each of side plates 114. This rigidly fixes the relative position of bearing shaft 124 relative to side plates 114 and relative to the housings 122 in which locating engagement pins 102 are mounted. The movable wing structures 110 can support some of the weight of containers engaged by pins 102, and in the event a longer container is set down vertically on pins 102, hold pin housings 122 stationary as pins 102 are resilient forced to retract against spring pressure. This enables a container to be set down approximately and displaced until the corner engaging pin snap into the container corner fittings.

When locking handle 132 is rotated counter clockwise in the embodiment of FIG. 5, handle extensions 134 of locking handle 132 move free of slots 136 in side plates 114. Bearing shaft 124 is then free to move outwardly relative to side plates 114 and the movable wing structure 110 drops downwardly, pivoting about horizontal pivot axis 112 and placing wing structure 110 out of the way along the side of trailer 20.

Figure 6:
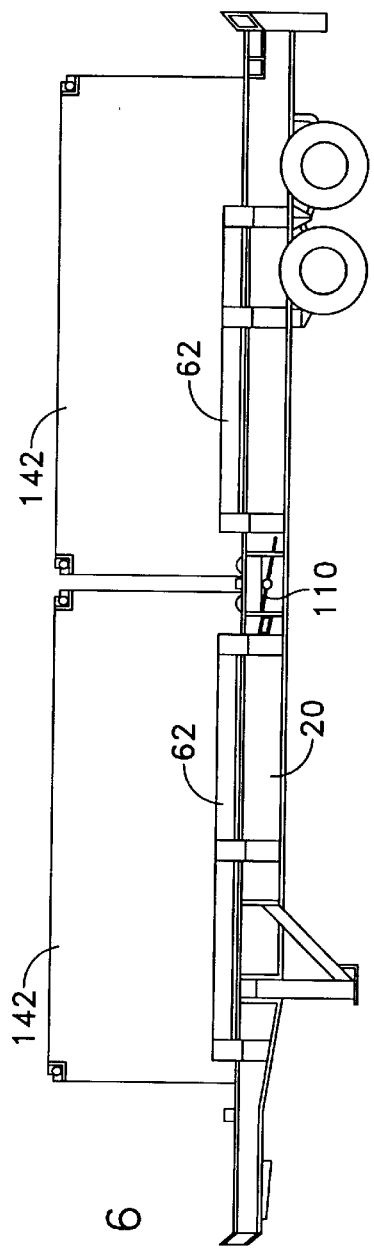
FIG. 6 is a side elevation view showing the invention carrying two half-standard-length intermodal containers.
Figure 7:
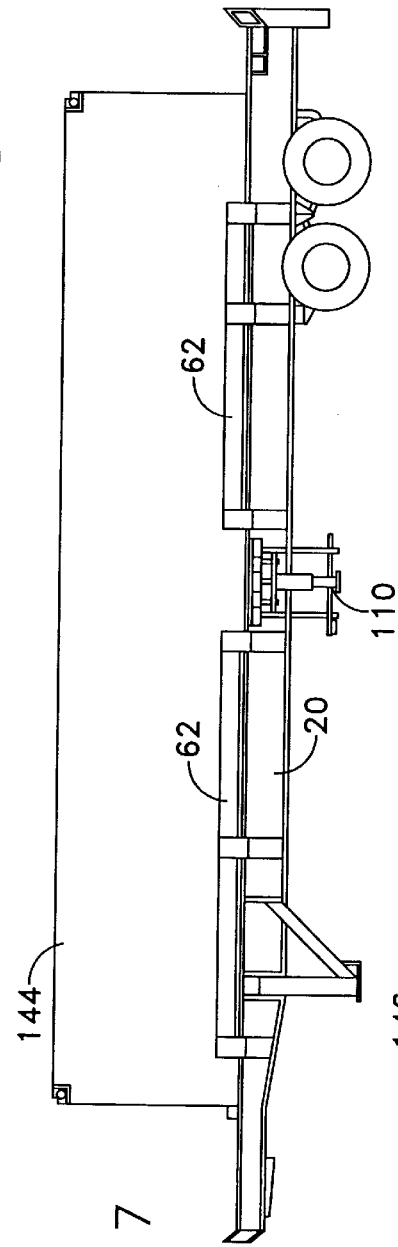
FIG. 7 is a side elevation with the trailer of the invention carrying one full-standard-length container.
Figure 8:
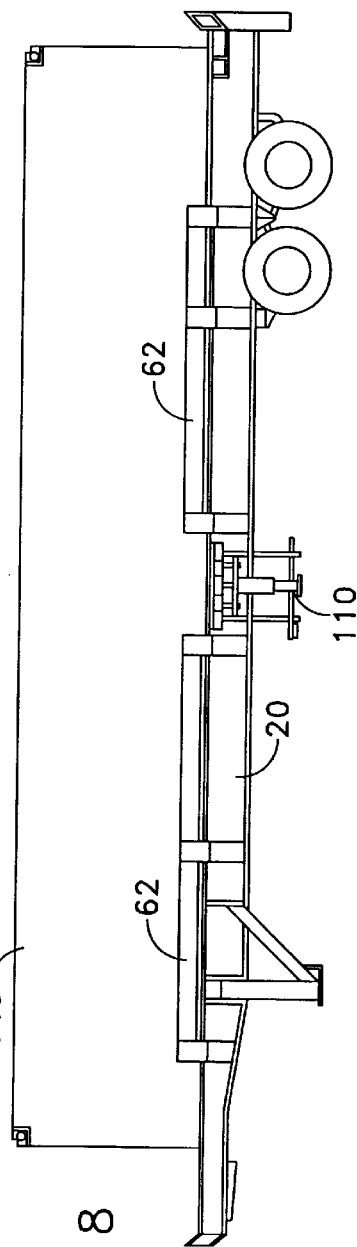
FIG. 8 is a side elevation showing the same trailer carrying a container that exceeds the standard length.

FIGS. 6 through 8 show examples of how a trailer 20 according to the invention is apt for carrying different lengths of container without the need for substantial setting up to accommodate different specific container sizes. In FIG. 6, two half-length containers 142 (e.g., each being twenty feet long) are centered on the length of trailer 20 by being brought adjacent to central locating pins 82 in the bed of trailer 20, i.e., the pins mounted on center bolster plate 75. The short containers can be engaged at their corner fittings in this position by rotating the wing structures 110 upwardly to bring their corner engaging pins 102 into position for engagement with containers 142. Longer half-size containers (not shown) can be mounted in the same manner, up to the full longitudinal capacity of trailer 20, because the containers are located only centrally along the length of trailer 20. Two half size containers that occupy the entire length of trailer 20 are possible, the front container of a long container combination simply depressing the front locating pins 84 associated with front bolster plate 52.

Half-size containers can be attached to one another by inter-box couplings enabling them to be handled as a unit. Some forms of standard inter-box connectors or "IBC" couplings have oppositely oriented engagement means, one set fitting into in the corner fittings of two adjacent containers, which are typically female on the container side, and the other protruding downwardly as a male or female coupling element. Where IBC couplings having downward male pins are used, the "corner" engaging locating pins 102 according to the invention can have female structures on the ends of resilient pins to receive the IBC couplings protruding downwardly, rather than to engage the container corners directly.

Rear bolster plate pins are possible but are not shown. In general it is only necessary to precisely locate one end of a container, thereby inherently locating the other end of the container as well. This is illustrated in FIG. 7, where a longer single container 144 is carried on trailer 20. Movable wing supports 110 are rotated downwardly as there is no centrally placed engagement structure on container 144. However, if wing supports 110 were left up, for example inadvertently, the result would only be that pins 102 would be forced to retract, without substantial damage to the container or the pins. Likewise, the locating pins 82 in the trailer bed on center bolster plate 75 have retracted under the weight of container 144. The container is precisely located on the trailer by abutting against the rear of the locating pins in the trailer bed on the front bolster plate.

For an even longer container 146 as in FIG. 8, the full available length of the trailer can be occupied by the container 146, the weight of which depresses the front and center bolster plate locating pins 84, 82. Also, as in FIG. 7, the movable engagement pin wing structures 110 are unnecessary for this container 146 and are pivoted downwardly out of the way.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An improved transportation system for intermodal containers, each of the containers having corner fittings located at each outside corner of said container, at a standardized spacing for engagement with complementary complementary devices of lifting apparatus for the containers, said containers including full size containers and partial size containers, and the complementary devices of said lifting apparatus including engagement devices spaced for engaging a plurality of said partial size containers at one time, and further comprising a temporary support vehicle operable to carry said full length containers without engaging the corner fittings thereof, whereby the full length containers and said partial size containers are supportable when placed approximately on said temporary support vehicle, the improvement comprising:

said temporary support vehicle having a container support arrangement with deployable engagement devices at said standardized spacing, that are limited to fixing positions of said partial size containers relative to one another, the deployable engagement devices engaging each of the partial size containers at two points so as to relatively position the partial size containers to complement the lifting apparatus.

2. The improved transportation system for intermodal containers according to claim 1 comprising:

a trailer chassis on said vehicle defining a load bearing length and width between a front and a rear;

at least one locating pin spaced between the front and the rear, resiliently biased to protrude such that the locating pin provides a reference for abutment with a container of a shorter load bearing length and is retractable for carrying a container of a longer load bearing length; and, at least one engagement,pin mounted on the chassis and spaced from the locating pin along the load bearing length, the engagement pin being spaced from the locating pin and movably mounted so as to provide for temporary engagement with a corner fitting of a container when said container of the shorter of said lengths is abutted against the locating pin according to said reference thereby cooperating with said at least one locating pin to positionally align said container on said load bearing length and width of said trailer chassis.

3. The improved transportation system of claim 2, wherein the locating pin is disposed substantially midway along the load bearing length such that containers of different lengths are transportable on the trailer chassis while extending by different distances forwardly and rearwardly of the locating pin.

4. The improved transportation system of claim 3, further comprising a deployable wing structure carrying the engagement pin, the wing structure being deployed to place the engagement pin in position for engagement with the container and being retractable from said position.

5. The improved transportation system of claim 4, wherein the engagement pin is resiliently retractable under weight of the containers.

6. The improved transportation system of claim 5, wherein the wing structure comprises a movable section coupled to the chassis to deploy and to retract the engagement pin.

7. The improved transportation system of claim 6, wherein the wing structure is hingeably mounted on a lateral side of the chassis, the wing structure being pivotable on a horizontal pivot axis for raising and lowering a mounting of the engagement pin.

8. The improved transportation system of claim 7, further comprising a support shaft movably mounted to bear against the chassis at a space from the horizontal pivot axis and lockable relative to the movable section for holding the engagement pin in a deployed position.

9. The improved transportation system of claim 8, further comprising a locking handle extending transversely from the support shaft, and wherein the locking handle is received in a slot on the movable section for locking the support shaft.

10. The improved transportation system for intermodal containers according to claim 1 comprising:

an elongated chassis on said vehicle defining a load bearing area having a front and a rear;

a movable section having a wing structure hingeably mounted on a lateral side of the chassis, the wing structure being pivotable on a horizontal pivot axis for raising and lowering a mounting;

a locating pin disposed in the mounting and protruding upwardly when the wing structure is pivoted upwardly on the horizontal pivot axis so as to provide for temporary engagement with a corner fitting of a container when said container is abutted against the locating pin thereby positionally aligning said container on said load bearing area of said chassis;

a manual locking means bearing between the movable section and the chassis for locking the wing structure; and, wherein the wing structure is disposed at a space from both the front and the rear, whereby the chassis can support one intermodal container when the wing structure is retracted and more than one intermodal container when the wing structure is deployed.

11. The improved transportation system of claim 10 wherein the manual locking means comprises a locking handle extending transversely from a support shaft, and wherein the locking handle is received in a slot on the movable section for locking the support shaft.

12. An improved transportation system for intermodal containers, each of the containers having corner fittings located at each outside corner of said container, at a standardized spacing for engagement with complementary devices of vehicles for transporting said containers, and for engagement with complementary devices of lifting apparatus for the containers, said containers including full size containers and partial size containers, and the complementary devices of said lifting apparatus including engagement devices spaced for engaging a plurality of said partial size containers at one time, and further comprising a temporary support vehicle operable to carry said full length containers without engaging the corner fittings thereof, whereby the full length containers and said partial size containers are supportable when placed approximately on said temporary support vehicle, the improvement comprising:

said temporary support vehicle having a container support arrangement with deployable engagement devices at said complementary spacing and including a locking handle extending transversely from a support shaft wherein the locking handle is received in a slot on a movable section for locking the support shaft, the deployable engagement devices being limited to fixing positions of said partial size containers relative to one another and engaging each of the partial size containers at two points so as to relatively position the partial size containers to complement the lifting apparatus.

13. The improved transportation system of claim 12 comprising a locating pin that is resiliently mounted on a wing structure forming one of said deployable engagement devices such that the locating pin is retractable under weight of a container placed on the locating pin when the wing structure is deployed.

14. The improved transportation system of claim 13 further comprising at least one resiliently mounted stop pin mounted to extend resiliently upwardly from the temporary support vehicle chassis, the stop pin defining an end point between the front and the rear of a load bearing area of the support vehicle for stopping a container of predetermined length, and wherein the stop pin is retractable under weight of a container having a length exceeding the predetermined length.

15. The improved transportation system of claim 13 comprising two said locating pins on the wing structure, the locating pins being spaced to complement engaging structures of two adjacent intermodal containers placed end to end.

* * * * *